United States Patent [19]

Fugleberg et al.

[11] 4,452,762

[45] Jun. 5, 1984

[54] HYDROMETALLURGICAL PROCESS FOR THE RECOVERY OF VALUABLE METALS FROM METALLIC ALLOYS

[75] Inventors: Sigmund P. Fugleberg, Pori; Bror G. Nyman, Vanha-Ulvila; Stig-Erik Hultholm; Asko Parviainen, both of Espoo; Jussi Rastas, Pori, all of Finland

[73] Assignee: Outokumpu Oy, Outokumpu, Finland

[21] Appl. No.: 271,038

[22] Filed: Jun. 5, 1981

[30] Foreign Application Priority Data

Jun. 19, 1980 [FI] Finland .................................. 801984

[51] Int. Cl.³ ............................................... C01G 1/00
[52] U.S. Cl. ....................................... 423/54; 423/87; 423/658.5; 423/1
[58] Field of Search ......... 423/146, 150, 558, DIG. 2, 423/57, 54; 134/13

[56] References Cited

U.S. PATENT DOCUMENTS

| | | | |
|---|---|---|---|
| 2,185,095 | 12/1939 | Smith | 423/558 |
| 2,877,146 | 3/1959 | Francis | 134/13 |
| 3,100,727 | 8/1963 | Labergere | 134/13 |
| 3,676,107 | 7/1972 | Barnard | 423/146 |
| 4,220,627 | 9/1980 | Fugleberg | 423/146 |

Primary Examiner—Herbert T. Carter
Attorney, Agent, or Firm—Brooks, Haidt, Haffner & Delahunty

[57] ABSTRACT

A process for the recovery of valuable metals from metallic alloys having iron as their principal constituent is disclosed in which the metal is leached by means of a sulfuric acid solution having such a concentration that a nearly saturated salt solution is obtained, and after the separation of a possible leach residue the solution is heated close to the boiling point, at which time an acid solution is added in an amount corresponding to the salt which has passed out of the solution, in order to crystallize the salt mixture, the crystallized material is separated from the solution and is decomposed under sulfating conditions, whereafter the metal salts are leached out from the iron oxide by means of water.

3 Claims, 3 Drawing Figures

HYDROMETALLURGICAL PROCESS FOR THE RECOVERY OF VALUABLE METALS FROM METALLIC ALLOYS

BACKGROUND OF THE INVENTION

The present invention relates to a process for the recovery of valuable metals from metallic alloys, especially from so-called "furnace residues", which are produced either as by-products in various smelting processes or as the primary product in the recovery of valuable metals from slag (FI Lay-Open Print 56 398) or other materials, during which these valuable metals concentrate in the furnace residue which is forming.

The process according to the invention can be used for treating any metallic materials which contain iron (usually as the main component), cobalt, nickel, molybdenum, copper, gold, silver, platinoids, rhenium, gallium, indium, germanium, tin, arsenic, phosphorus, sulfur, carbon, etc. The process is especially advantageous for the treatment of materials which contain all or several of the above-mentioned elements, but all furnace residue alloys can be treated advantageously by the process according to the invention.

The so-called furnace residues are a well known concept in the pyrometallurgical production of metal, primarily copper. Furnace residue is formed when the reduction potential rises to such a degree that the iron present in the melt is entirely or in part reduced to metal and sinks, owing to its weight, to the bottom of the furnace. Other elements the reduction potential of which is the same as or lower than that of iron are reduced simultaneously with iron. If they dissolve in iron, they tend to concentrate in it, in which case iron serves as a collector. In this manner a high degree of concentration is achieved for those elements which are present in very low concentrations in the primary concentrates, and so the furnace residue may contain considerable amounts of valuable metals. An example of the composition of furnace residue (%) is given in Table 1.

TABLE 1

| Fe | Co  | Ni | Cu | Mo  | W   | Ag   | Au     | Re   | As  | P   | S | C   |
|----|-----|----|----|-----|-----|------|--------|------|-----|-----|---|-----|
| 75 | 1.5 | 2  | 10 | 1.5 | 0.3 | 0.03 | 0.0007 | 0.01 | 0.3 | 1.2 | 4 | 0.4 |

It can be seen from the above analysis that the concentration of valuable metals is considerably high, and also that iron is the predominant element. When a product according to Table 1 is leached, the solution contains tens of times more iron than cobalt and nickel, and the profitability of the process used for recovering Co and Ni depends on how the Fe is separated. In addition, it can be seen that the composition is very complicated and that a very high selectivity regarding the various elements is required of the process for the recovery of the valuable metals.

The commonly used processes for the separation of iron from solutions include oxidation by means of either air or oxygen, whereby the iron precipitates as an oxyhydroxide when a neutralizing agent is added. However, such a process produces a large amount of space-consuming precipitate, which results in a considerable washing problem. In addition, the neutralizing agent constitutes a considerable cost even when the least expensive neutralizing agent possible is used.

One method for avoiding the neutralization is to carry out the oxidation in an autoclave at about 200° C., whereby the iron is precipitated as hematite:

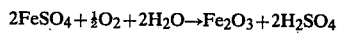

According to this reaction about 30–40 g Fe/l can be precipitated as hematite. The $Fe_2O_3$ can be used as raw material in iron production, whereby the environmental problem due to the storing of iron precipitate is eliminated. Unfortunately it is, however, difficult to produce $Fe_2O_3$ with a sufficiently low sulfur content, since alkaline iron sulfates are also easily precipitated as impurities in iron oxide. The process also requires an expensive and mechanically complicated apparatus.

The iron can also be precipitated as an alkaline sulfate ($FeSO_4OH$), whereby at least 100 g Fe/l can be precipitated without neutralization, but in this case, storage of the precipitate, which constitutes an environmental hazard, is necessary.

By the process according to the present invention, it is possible to treat the above-mentioned and similar material in such a manner that the valuable metals can be recovered economically.

SUMMARY OF THE INVENTION

According to the present invention there is provided a process, in which metal values are leached by means of an acid solution, preferably a sulfuric acid solution, having such a concentration that a nearly saturated salt solution is obtained, and after the separation of a possible leach residue the solution is heated close to the boiling point, at which time an acid solution is possibly added, preferably in an amount corresponding to the salt which has passed out of the solution, in order to crystallize the salt mixture, the crystallized material is separated from the solution and is decomposed under sulfating conditions, whereafter the metal salts are leached out from the iron oxide by means of water, and the metal salt solution is treated by a known method.

Iron, cobalt, nickel and any molybdenum, tungsten and copper which may be present are recovered from metallic alloys which have iron as their principal component in accordance with the invention. The metal alloy is first leached with sulfuric acid. The acid concentration is such that at a temperature of 55°–75° C. as high a concentration of iron, cobalt and nickel salts as possible to go into solution. The pH of the solution is then raised above 2, preferably to between 2.3 and 3.5 for precipitating molybdenum, tungsten, copper, and other metals present in the solution into a leach residue, which residue is separated. This first leach residue is further leached in an oxidizing alkaline leach stage using a NaOH solution for recovery of molybdenum, tunsten and copper. Molybdenum is separated from the solution by extraction by means of a suitable extractant. The saturated salt solution from the first leaching stage is heated to a temperature of 90°–105° C., at which time an amount of acid is added corresponding to the salt which has passed out of solution as solids, in order to crystallize the salt mixture. The crystallized salts of iron, cobalt, and nickel are then decomposed under sulfating conditions, whereafter the cobalt salts and nickel salts are leached from iron oxide by means of water and the cobalt and nickel salt solution is then treated for recovery of the cobalt and nickel therefrom.

DESCRIPTION OF THE PREFERRED EMBODIMENTS

Figure 1:
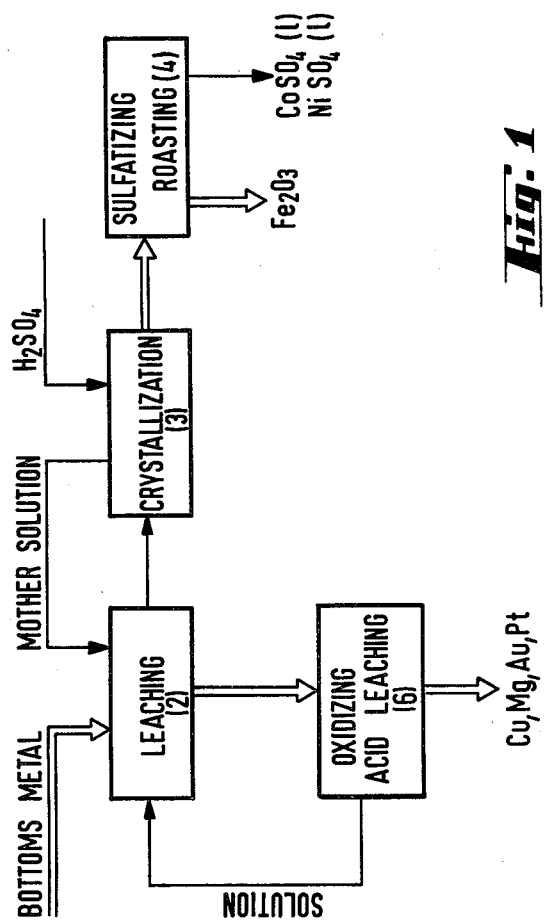
FIGS. 1-2 depict flow diagrams of two different total process alternatives.

In the process alternative according to FIG. 1, metal according to Table 1 is leached during leaching stage 2 with a sulfuric acid solution, which is advantageously the mother liquor obtained from the subseqent crystallization stage of the process. During the leaching stage, Fe, Co, Ni and other metals pass into the solution as sulfates, whereby hydrogen gas is released and the products obtained are a metal sulfate solution, in which the clearly predominant component is $FeSO_4$, and a leach residue, which contains metals nobler than hydrogen gas, poorly soluble oxides, and other poorly soluble components. The leach is carried out at about 65° C. by using an acid solution with such a concentration that a saturated $FeSO_4$ solution is obtained during the final stage of the leach. The leach residue is separated, and the sulfate solution is directed to stage 3, in which the temperature is raised to between 90° and 105° C. in order to crystallize the iron, cobalt and nickel. At this temperature the solubility of iron sulfate is considerably lower than at 65° C., and in this case the iron sulfate crystallizes as a monohydrate, $FeSO_4.H_2O$. The cobalt and nickel also crystallize as monohydrates. In order to facilitate crystallization, an amount of sulfuric acid corresponding to the sulfate amount passing out of the solution in the sulfate salt can still be added at this stage. Owing to this acid addition, the solubility of the iron sulfate decreases further and a greater "iron sulfate delta" is obtained, owing to which a lower solution flow is necessary in the process per iron sulfate unit produced.

Several advantages are gained by the above process. When the leach is carried out at 65° C., a solution is obtained which may contain about 180 g Fe/l, if material according to Table 1 is leached. By raising the temperature to 100° C., the solubility is lowered so that only about 120 g Fe/l remains in the solution, whereby about 60 g Fe/l can be crystallized. When sulfuric acid is added, the solubility of iron sulfate lowers further, and it has been shown that by adding, for example, 150 g $H_2SO_4/l$, it is possible to precipitate 90-95 g Fe/l, which means that, by using this acid addition, more sulfate can be removed from the process than has been added to it (as sulfate, 150 g $H_2SO_4$ corresponds to about 85.5 g Fe). It is evident that an equal amount of sulfate must be separated in the form of crystals as is added in acid form, since otherwise the amount of solution in the process increases. By this procedure it is thus possible to crystallize iron 100 g/l, which is very advantageous in terms of the technical implementation of the process. Such removal of iron is effected without evaporation, a fact which is a great advantage, since a considerable amount of energy is thereby saved. The savings of energy are also increased by the fact that the heat of dilution of the sulfuric acid can be fully exploited in the heating of the crystallization stage. In addition, it has been shown that during the crystallization stage the addition of acid increases the speed of crystallization, which reduces the treatment period required. At the same time, larger crystals, which are easier to filter, are obtained, which is surprising as the precipitation rate is at the same time increased. Owing to the addition of acid, the further treatment (drying, transportation) of the crystals is also easier, since they are less adhesive and do not agglomerate easily during cooling.

One advantage offered by crystallization at a high temperature is the fact that sulfate precipitates as monohydrate. The crystallization can also be carried out by cooling, since the solubility is also reduced by a lower termperature, but thereby hexa- and hepta-hydrates ($FeSO_4.6H_2O$, $FeSO_4.7H_2O$) are obtained, and the removal of water from these results in considerable extra energy costs regardless of whether the removal of water takes place in a separate drying stage or in connection with the sulfating roasting, since the amount of heat obtained from the waste gases is thereby respectively decreased.

There is a complete outlet, with the iron sulfate, for the cobalt and nickel present in the solution after the leaching stage 2. The sulfates of cobalt and nickel are not completely isomorphous with iron sulfate, and for this reason they do not crystallize in the same proportion in relation to iron as they are present in the solution. It has been shown that, when a material according to Table 1 is treated, the concentration of cobalt increases to about 4 g/l, and the concentration of nickel to about 10 g/l in the cycled solution, before the leaching and crystallization are in an equilibrium. When these concentrations are reached during the leach, the amount which crystallizes equals the amounts passing into the solution.

After crystallization, the crystals are separated from the mother liquor. The mother liquor, which contains the sulfuric acid which has been added, is returned to the leaching stage 2, in which a metal amount corresponding to the amount which has crystallized is re-leached. The sulfate crystals are directed, after a possible drying, to the roasting stage, during which the crystals break down under the so-called normal sulfating conditions, under which $FeSO_4$ decomposes to $Fe_2O_3$ and $SO_2$ gas, the sulfates of Co and Ni being stable. By means of an aqueous wash of the roasted material, the Co and Ni can be leached and separated from the iron, and at the same time iron oxide is obtained which can be used as raw material for the production of iron. The cobalt and nickel can then be recovered from the solution by known methods.

As can be seen from Table 1, the furnace residue also contains many other elements, which also have their own specific effects on the process. Of these elements, especially sulfur may have a considerable influence on the leach. It has been shown that the sulfur present in the furnace residue at least in part reacts and forms secondary sulfides during the leaching procedure described above. These sulfides are for the most part copper sulfides ($Cu_2S$, $CuS$), but also nickel in particular (to a lesser degree, cobalt) can form secondary sulfides, especially if the leach is carried out at a low acid concentration. The result of this is that nickel and cobalt, which have been primarily leached, re-precipitate out from the solution and remain in the leach residue. The leach residue normally consists of copper compounds (sulfides, metal) and contains all noble metals and is a natural raw material for copper smelting plants, where all these substances are recovered. In copper smelting plants, most of the nickel and cobalt remains unrecovered, and therefore their concentrations in the leach residue should be reduced. It has also been shown that if the leach residue, after the above-mentioned leaching stage 2, is treated under suitably oxidizing conditions in an acid solution, the cobalt and nickel can be leached out with a relatively high selectivity from the precipitate. Good results have been obtained by carrying out a second leaching stage 6, during which the leach residue is oxidized by means of air in a solution which contains 10–100 g $H_2SO_4$/l, the temperature being 70° C. However, in order to achieve a satisfactory result, the oxidation must be carried out to such a degree that part of the copper also passes into the solution, and when material according to Table 1 has been treated, it has been suitable to leach about ⅓ of the copper. The solution which is in this case obtained after the separation of the secondary leach residue (which is taken to the copper smelting plant) is returned to the first leaching stage 2. Thereby, the cobalt and nickel reach the crystallization stage 3 together with sulfate solution, and the copper precipitates and is returned with the residue to the oxidizing leaching stage 6. Thereby, a cycled copper amount is obtained, which does not, however, have an adverse effect on the process; on the contrary, it has been shown that it has an advantageous effect on the leaching stage 2, in which the formation of hydrogen sulfide is prevented, and the precipitation of nickel sulfides is also to some extent prevented, since copper binds sulfur more readily in sulfides. A good yield of cobalt and nickel is achieved by means of the leaching stage 2 described above, and at the same time all Cu, Ag, Au and platinoids are recovered in precipitates which can be used in copper smelting plants.

Figure 2:
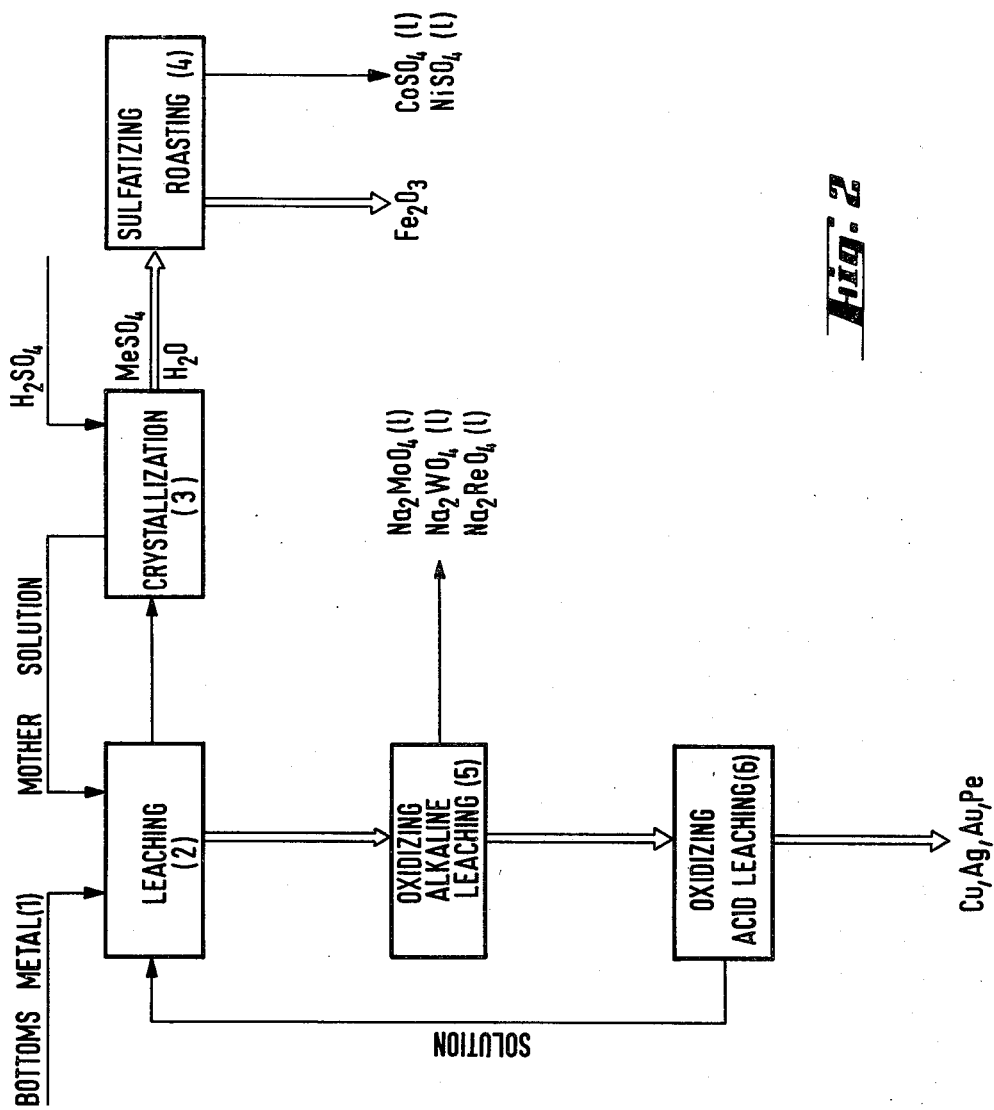

The furnace residue can also contain other elements, such as Mo, W, Re, Ga, Sn, etc., the recovery of which may be profitable. These elements cannot be recovered by using the above-mentioned two leaching stages 2 and 6, but it is necessary to perform a separate treatment. FIG. 2 shows a flow diagram of such a process alternative. The said elements to some degree pass into the solution during the first leaching stage 2, especially at the beginning of the leach, as the pH is still low, but this dissolved amount is still so low that, when these elements are recovered from the solution, a small yield is obtained at this leaching stage. If the leach is performed so that towards the end of the leach the pH is raised above 2, preferably between 2.3 and 3.5, these elements are completely precipitated out from the solution. In addition, it has been shown that Mo, W, Re, Ga and Sn can thereafter be leached in a sodium hydroxide solution having a temperature >70° C. For Ga and Sn, a high alkali concentration, e.g. 10–50 g NaOH/l, must be used. At this stage 5, the oxidation can be carried out using air or oxygen. Mo is recovered from the above-mentioned solution by extracting it by means of a suitable extractant, e.g. HDEHP (di-2-ethylhexyl phosphoric acid).

When materials which contain Ca and/or Sn are leached, Ga and/or Sn can be recovered advantageously, after the separation of the leach residue, by selective precipitation out from the solution, the pH being 7–9, whereafter the Mo, W and Re are recovered from the solution by, for example, extraction, after the filtration of the hydroxide of Ga and/or Sn. If the material treated does not contain Ga or Sn, the solution is fed directly to the said Mo extraction stage.

It is evident from the above that all the valuable metals present in materials according to Table 1 can be caused to pass into the solution with a high yield in three leaching stages. In some cases, the composition of the metal may be such that one leaching stage can be eliminated, a procedure which is naturally also within the scope of the present invention.

The process according to the invention and the result which can be obtained with it are illustrated in the following example.

EXAMPLE

Figure 3:
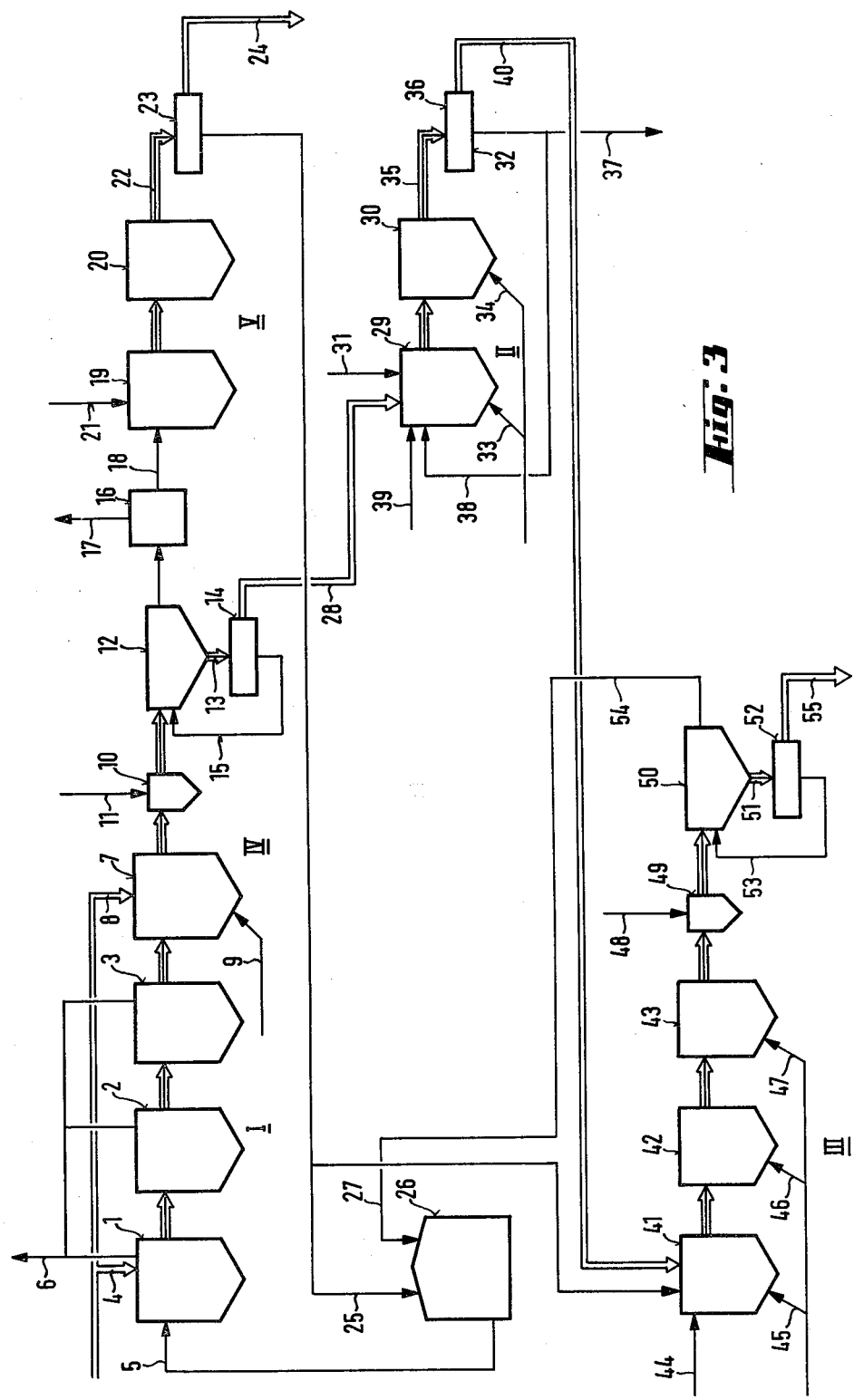
FIG. 3 depicts a coupling arrangement according to Example 1.

A granulated furnace residue containing finely divided sulfides, arsenides and phosphides, and a small amount of oxides, and having the composition Fe 74.6%, Cu 10.1%, Co 1.3%, Ni 1.8%, Mo 1.1%, W 0.03%, Re 110 g/t, Ga 100 g/t, As 0.24%, Ag 178 g/t, Au 7.9 g/t, P 1.4% and S 4.0%, was leached in three stages using a continuous-working pilot apparatus. Its coupling arrangement is shown in FIG. 3. The leaching stages were a dilute-acid leach I, an alkaline leach II and a strong-acid leach III. The P and Mo removal stage IV was coupled as a continuation of stage I and preceded the crystallization stage V for monhydrate sulfate salt of Fe(II), Co, Ni.

Granulation product 4 at 520 g/h and an acid mother liquor 5 at 3.6–4.2 $dm^3$/h from storage vessel 26 were added into reactor 1, the volume of which was 6.0 $dm^3$ and which was the first reactor of the leaching stage I. Coupled in series with it were reactors 2 and 3, which were of the same size and were part of the same leaching stage. The temperature was maintained between 63° C. and 67° C. in all reactors, and a relatively strong mixing was applied in the reactors. The generated hydrogen gas 6 passed freely from the reactors. The solution and the solid, which proceeded from one reactor to another as an overflow, were directed to a fourth reactor 7 of the same size, into which granulation product 8 at 15 g/h was also added, and air 9 was added to the lower section of the reactor. The reactor 7, which was part of the P and Mo removal stage IV, was also operated within the same temperature range as the three previous reactors and with the pH maintained between 2.5 and 3.5. The pH control was effected by regulating the flow of the mother liquor 5.

From the reactor 7 the slurry was directed further as an overflow via a small mixing reactor 10 into a thickener 12. Flocculant 11 was added to the reactor 10 having a volume of 0.5 $cm^3$, in order to improve the operation of the thickener. The underflow 13 from the thickener was filtered by means of a vacuum filter 14, from which the filtrate 15 was returned to the thickener. The overflow from the thickener was concentrated in an evaporator 16, from which 5–15% of the overflow left as water 17. The overflow from the evaporator was directed to the first crystallization reactor 20. The volume of the reactors with mixing was 4.0 $dm^3$. Concentrated sulfuric acid 21 at 0.44 $dm^3$/h was added into the reactor 19. The temperature during the said crystallization stage was maintained between 95 and 100 °C. The overflow 22 from the reactor 20 was filtered with the vacuum filter 23 in order to separate the crystallized Fe, Co, Ni sulfate salt 24. Most 25 of the filtrate was directed to the storage vessel 26, and the remainder 27, 0.65 $dm^3$/h, of the filtrate was directed to the leaching stage III, from which the separated solution was pumped to the above-mentioned storage vessel 26.

The leach residue 28 separated by means of the vacuum filter 14 and which had been washed with 2 $m^2$ water per one kilogram of solid, was pumped into the first reactor 29 of the alkaline leaching stage II. The volume of the reactor 29 was 4.0 dm³, and it was coupled by means of an overflow line in series with another mixing reactor 30 of the same size. NaOH was added to the reactor 29 at 0.15 kg/h, using a 50% alkaline solution 31. By means of the flow of this solution the NaOH concentration of the overflow 35 from the reactor 30 was maintained between 5 and 10 g/l. The progress of the leach was regulated by means of air amounts 33 and 34 directed under the reactor mixers, the air amounts remaining between 10 and 20 dm³/min. The temperature of the reactors was maintained between 90° and 95° C. The overflow 35 from the reactor 30 was filtered by means of a vacuum filter 36, and the filtrate 32 obtained from the filter was divided into two parts, the product solution flow 37 of 0.39 dm³/h and the internal cycled solution 38 of the leaching stage. By this division, the concentration of Mo in the product solution rose somewhat above 14 g/l. The amount of slurry in the reactors was maintained almost constant by adding water 39 into the reactor 29.

The leach residue 40 filtered by means of the vacuum filter 36 was added into the first reactor 14 of the leaching stage III; the leach residue had been washed using likewise 2 dm³ of hot water per one kilogram of solid. The reactors 41, 42 and 43, all belonging to this leaching stage and being coupled to each other by means of overflow lines, were mixing reactors of 4 dm³. In addition to the addition of mother liquor 27 to the abovementioned crystallization, water 44 at 0.5 dm³/h was added into the reactor 41 in order to prevent excessive concentration. The concentration of copper in the reactor solutions was maintained between 5 and 15 g/l by varying the air amounts 45, 46, and 47 added under the mixers between 3 and 10 dm³/min per reactor. The temperature of the leach was 90°–95° C. The overflow from the reactor 43 was directed to the batching reactor 49, the volume of which was 0.5 dm³, for the addition of flocculant 48. Thereafter, the overflow flowed into the thickener 50, the underflow 51 from which was filtered and washed using a vacuum filter 52. The washing water amount was again 2 dm³ per one kilogram of solid. The filtrate 53 was returned to the thickener, the overflow 54 from which was pumped into the abovementioned storage vessel 26. It was possible to recover copper and noble metals from the leach residue 55 by methods known to experts in the art.

The results of the leach are shown in the following tables. Table 2 shows the analyses of the initial material and the various leach residues, as well as their quantities, and Table 3 shows the concentrations of the analysed solutions as well as the solution flows used.

TABLE 2

| Solids of pilot run | ṁ kg/h | C % | | | | | | | | | | | | |
|---|---|---|---|---|---|---|---|---|---|---|---|---|---|---|
| | | Fe | Cu | Co | Ni | Mo | W | Re | Ga | As | Ag | Au | P | S |
| Initial material 4 and 8 | 0.535 | 74.6 | 10.1 | 1.3 | 1.8 | 1.1 | 0.03 | 0.0110 | 0.0100 | 0.24 | 0.0178 | 0.00079 | 1.4 | 4.0 |
| Leach residue 28 of leach I | 0.168 | 22.8 | 40.0 | 0.90 | 5.10 | 3.46 | 0.090 | 0.033 | 0.030 | 0.95 | 0.0570 | 0.0025 | 4.85 | 12.5 |
| Leach residue 40 of alkaline leach II | 0.151 | 25.4 | 44.5 | 1.00 | 5.67 | 0.19 | 0.005 | 0.0035 | 0.005 | 0.24 | 0.0620 | 0.0026 | 1.15 | 11.0 |
| Leach residue 55 of leach III | 0.083 | 1.5 | 65.0 | 0.15 | 0.22 | 0.27 | 0.010 | 0.0055 | 0.010 | 0.10 | 0.111 | 0.0052 | 0.70 | 21.3 |
| Crystallized Fe, Co, Ni salt 24 | 1.32 | 30.1 | 0.03 | 0.52 | 0.72 | 0.01 | | | | | | | 0.03 | |

ṁ = mass flow,
C = concentration

TABLE 3

| Solutions of pilot run | V̇ dm³/h | C g/dm³ | | | | | | | | | | |
|---|---|---|---|---|---|---|---|---|---|---|---|---|
| | | Fe | Cu | Co | Ni | Mo | W | Re | Ga | As | P | H₂SO₄ |
| Acid solution 5 to leach I | 3.6–4.2 | 80.7 | 3.43 | 3.74 | 9.24 | 0.0930 | | | | 0.075 | 0.397 | 172 |
| Sulfate solution 18 to crystallization V | 3.3–4.0 | 180 | 0.001 | 5.32 | 9.82 | 0.114 | | | | <0.025 | 0.230 | 1.5 |
| Mother liquor 25 and 27 from crystallization V | 3.1–3.7 | 80.0 | 0.001 | 3.79 | 8.25 | 0.086 | | | | <0.025 | 0.203 | 224 |
| Sulfate solution 54 from leach III | 1.08 | 12.2 | 12.2 | 3.60 | 12.7 | 0.110 | | | | 0.259 | 1.14 | 42 |
| | | g/dm³ NaOH | | | | | | | | | | g/dm³ SO₃ |
| Molybdenum solution 37 from alkaline | 0.39 | 5–10 | 0.012 | | | 14.2 | 0.370 | 0.133 | 0.115 | 3.05 | 16.7 | 14.6 |

TABLE 3-continued leach II

V = volume flow,
C = concentration,
< = less than

What is claimed is:

1. A process for the recovery of iron, cobalt, nickel, molybdenum and tungsten from metallic alloys having iron as their principal constituent, comprising leaching such metal alloy in a first leaching stage with a sulfuric acid solution at a temperature of 55° to 75° C., the concentration of the acid being sufficient to produce as high a salt concentration as possible of iron, cobalt and nickel salts in solution; then raising the pH value above 2 at the end of the first leaching stage to precipitate molybdenum and tungsten values as a first leach residue; separating said first leach residue and further leaching the residue in an oxidizing alkaline leaching stage using a NaOH solution; separating molybdenum from the resulting solution by extraction by means of a suitable extractant; heating the salt solution from the first leaching stage to a temperature of 90°–105° C. and adding acid in an amount corresponding to the salt which has passed out of solution as solids, in order to crystallize salts of iron, cobalt and nickel, separating the crystallized salts from the solution, and returning the solution to the first leaching stage; decomposing the crystallized salts under sulfating conditions, and then leaching the cobalt and nickel salts from iron oxide by means of water.

2. The process according to claim 1, wherein the metal alloy also contains phosphorus and/or arsenic, said phosphorus and/or arsenic being precipitated along with the molybdenum and tungsten when the pH value is raised above 2.

3. The process of claim 1, in which the crystallized salts are decomposed at a temperature of 650°–700° C., in the presence of 2–15% $SO_2$.

* * * * *

UNITED STATES PATENT AND TRADEMARK OFFICE
CERTIFICATE OF CORRECTION

PATENT NO. : 4,452,762

DATED : June 5, 1984

INVENTOR(S) : Sigmund P. Fugleberg et al

It is certified that error appears in the above-identified patent and that said Letters Patent is hereby corrected as shown below:

Column 7, line 22:

"the first reactor 14" should read:

--the first reactor 41--.

Signed and Sealed this

Ninth Day of October 1984

[SEAL]

Attest:

Attesting Officer

GERALD J. MOSSINGHOFF

Commissioner of Patents and Trademarks